Figure 1:
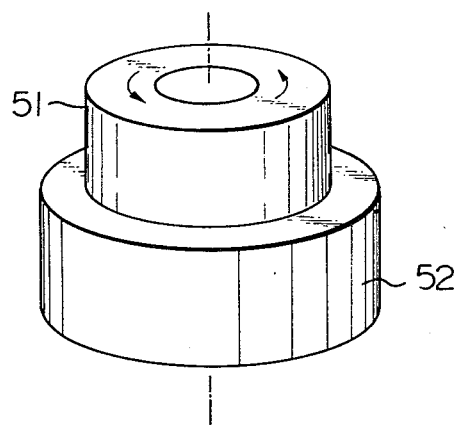

United States Patent [19]

Ueda et al.

[11] 4,316,834

[45] Feb. 23, 1982

[54] WEAR RESISTANT SLIDING ELEMENT HAVING A LOW COEFFICIENT OF FRICTION

[75] Inventors: Hiroshi Ueda, Kasugai; Masao Shimazaki; Yasumitsu Kuwazuru, both of Toyota, all of Japan

[73] Assignee: Taiho Kogyo Co., Ltd., Aichi, Japan

[21] Appl. No.: 249,883

[22] Filed: Apr. 1, 1981

Related U.S. Application Data

[63] Continuation-in-part of Ser. No. 107,628, Dec. 27, 1979.

[30] Foreign Application Priority Data

Mar. 14, 1979 [JP] Japan .................................. 54-29482

[51] Int. Cl.³ .............................................. C08L 6/06
[52] U.S. Cl. .................................. 260/38; 260/37 EP; 260/42.22; 260/42.43
[58] Field of Search .................. 260/42.22, 38, 37 EP, 260/42.43

[56] References Cited

U.S. PATENT DOCUMENTS

| | | | |
|---|---|---|---|
| 3,152,099 | 10/1964 | de Gaugue | 260/38 |
| 3,168,487 | 2/1965 | Spokes et al. | 260/38 |
| 3,269,976 | 8/1966 | Ueda | 260/38 |
| 3,434,998 | 2/1969 | Aldrich et al. | 260/38 |
| 4,129,550 | 12/1978 | Nametkin et al. | 260/42.22 |

*Primary Examiner*—Lewis T. Jacobs
*Attorney, Agent, or Firm*—Burgess, Ryan and Wayne

[57] ABSTRACT

A sliding element according to the invention comprises from approximately 30 to approximately 80% of fine and coarse graphite powders, from approximately 0.5 to 30% of lead-containing powder, and from 15 to 45% of an organic resin binder, all percentages being by weight based on the weight of the hot pressed body. Due to incorporation of both graphite carbon powder and lead-containing powder in to the organic resin binder, the conformability, wear resistance and low friction properties of the sliding element are superior to those obtained by a single addition of the graphite carbon or lead powder alone.

16 Claims, 2 Drawing Figures

WEAR RESISTANT SLIDING ELEMENT HAVING A LOW COEFFICIENT OF FRICTION

This is a continuation in part application of U.S. Ser. No. 107,628 filed on Dec. 27, 1979.

The present invention relates to a sliding element, and particularly an improvement of a sliding element manufactured by hot pressing an organic resin binder, graphite powder and lead-containing powder. The term "sliding" used herein means relative movement of at least two sliding elements with friction between these elements, and the relative movement may be rotational, reciprocal or any other type movement.

It is known to blend in powder form a filler having a low coefficient of friction, such as lead, lead oxide, molybdenum disulphide, red oxide, sericite and zinc oxide, with an organic resin binder and to hot press the so blended mixture to form a sliding element. A hot pressed sliding unit has been used for various sliding contacts, in which an iron based stationary sliding element and the hot pressed sliding element are slidably brought into contact with one another. Conventionally, either lead containing powder i.e. lead powder or lead oxide powder, or graphite powder have been blended in a organic resin binder and, then, hot pressed. It is known from U.S. Pat. No. 3,269,976 to incorporate both graphite powder and lead-containing powder into the organic resin binder.

It is an object of the present invention to simultaneously, over those of the prior art, improve the wear resistance and the sliding characteristics of the sliding element containing both lead-containing powder and graphite powder.

In accordance with the objects of the present invention, there is provided a sliding element comprising a hot pressed body, said hot pressed body comprising: from 30 to 80% of a graphite powder including from approximately 15 to 60% of coarse graphite powder having the grain size of from 32 to 80 $\mu$m, and the belance of fine graphite powder having the grain size to less than 32 $\mu$m; from approximately 0.5 to 30% of lead-containing powder; and, from approximately 15 to approximately 45% of an organic resin binder, all percentages being by weight based on the weight of the hot pressed body.

The present inventors discovered that the wear resistance and sliding characteristic of the sliding element can be simultaneously enhanced by distributing the coarse and fine particles in the graphite component of the sliding element. In addition, the size of these particles and the proportion of one of these particles to the other must be selected so as to simultaneously enhance the wear resistance and sliding characteristic. Generally speaking, the achieved quality of the wear resistance in a sliding element is contradictory to that of the sliding characteristic. However, in the present invention, the sliding element is neither worn out considerably nor exhibits a considerable heat generation, which is very advantageous for operating the sliding member under a sliding condition expressed in detail herein, below with reference to FIGS. 1 and 2.

The components of the hot pressed body will now be explained in detail. First, the graphite powder and the graphite carbon powder are distinguished from a carbonaceous carbon powder, in that the carbonaceous carbon powder is a carbon which is not graphitized and is, therefore, amorphous. The graphite carbon powder has a property intermediate between the carbonaceous carbon powder and the graphite powder. The graphite carbon powder and the graphite powder, which powders are collectively referred to herein as graphite powder, can be used in the present invention. The graphite powder may be mainly composed of graphitized carbon or of amorphous carbon. In addition, the graphite powder may be composed of a completely graphitized carbon or of a not completely crystallized or graphitized carbon. When the percentage of the graphite powder, which consists of the coarse and fine particles, in the sliding element is less than approximately 30%, the sliding characteristics of the sliding element are deteriorated from those containing 30% or more of the graphite powder. When the percentage of graphite powder is more than approximately 80%, the hardness of the sliding element tends to be low. The percentage of the graphite powder is preferably from 40 to 70%. Furthermore, the graphite powder is preferably irregularly shaped. When the graphite powder consists only of the fine particles, the wear resistance of the sliding element is low. On the other hand, when the graphite powder consists only of the coarse particles, the coefficient of friction of the sliding element is high. The grain size of the fine particles is preferably up to 20 $\mu$m and the grain size of the coarse particles is preferably from 32 to 50 $\mu$m. The grain size of the fine particles is more preferably up to 10 $\mu$m.

Second, the lead-containing powder may be composed of lead or a lead alloy, and may contain a minor amount of lead oxide, which is formed on the powder surface. The grain size of the lead-containing powder should be 200 microns or less and preferably from 10 to 60 microns. When the percentage of the lead-containing powder in the sliding element is less than approximately 0.5%, the conformability due to the lead cannot be improved appreciably over that of the conventional sliding element. The conformability involves various technical concepts, but can usually be considered as a property of a quickly stabilized frictional contact between the face materials, particularly of different kinds. On the other hand, when the percentage of the lead-containing powder is more than approximately 30%, the strength of the sliding element is too low to provide the sliding element with a satisfactorily high wear resistance. The percentage of the lead-containing powder is preferably from 0.5 to 10%. Furthermore, the lead-containing powder is preferably irregularly shaped, such as seen in a crushed lead powder.

Third, the organic resin binder may be a resin having excellent toughness and rigidity as well as strong adhesion, such as a phenol resin, an epoxy resin or a furan resin. The organic resin binder may include lead stearate as a die lubricant in an appropriate amount, for example 1%, in addition to the resin. An inclusion of a trace amount of a soft material, such as cadmium and indium, in the organic resin binder is allowable. The percentage of organic resin binder should be from approximately 15 to approximately 45%. When the percentage of the organic resin binder is less than approximately 15%, the strength of the sliding element is too low to provide the sliding element with a satisfactorily high wear resistance. When the percentage of the organic resin binder is more than approximately 45%, the sliding characteristics of the sliding element are deteriorated from those of the sliding element containing approximately 45% or less of the organic resin binder.

The percentage of the organic resin binder is preferably from approximately 25 to approximately 40%.

Figure 2:
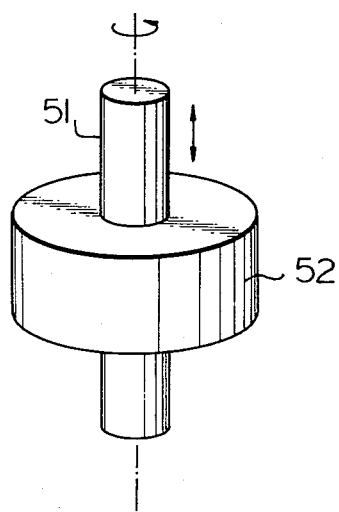

The present invention will be further explained with reference to the drawings, wherein:

FIGS. 1 and 2 are schematic views of several sliding contacts between the sliding element of the present invention and a face material.

The sliding element according to the present invention is suitable for use as a sliding element which is rotatable with respect to a stationary element of a sliding unit under a high pressure, for example, a thrust force, of for example up to 30 kg/cm$^2$ under dry friction condition.

The sliding element according to the present invention may have a structure as illustrated in FIGS. 1 and 2. The cylindrical sliding element 51 according to the present invention may be rotated around the central axis of a stationary hollow disc 52 consisting of a face material under a thrust force. The most severe sliding conditions under which the sliding element 51 can reliably be used are as follows.

A. Thrust pressure: 30 kg/cm$^2$ at the maximum.
B. Ambient temperature: 25° C.
C. Sliding speed: 20 m/sec at the maximum.
D. Friction condition: dry friction (without lubricant)
E. Face material: Nodular cast iron.

The sliding element 51 according to the present invention may be reciprocated or rotated in a stationary hollow disc 52 of face material as illustrated in FIG. 2. The sliding movement as illustrated in FIG. 2 occurs under less severe conditions than in FIG. 1. It is possible according to the present invention to provide a tight sliding contact between the rotatable and stationary elements mentioned above.

In an embodiment of the present invention, the sliding element further comprises at least one member selected from the group consisting of a silicon dioxide powder and a silicate powder, in an amount of from approximately 2 to approximately 15%. The silicon dioxide includes quartz and the silicate includes sericite and talc. The grain size of the silicon dioxide and silicate powders should be 50 microns or less and preferably in the range of from 5 to 25 microns. In the sliding element of the embodiment mentioned above, the percentage of graphite powder is from approximately 40 to approximately 70%, the percentage of lead-containing powder is from approximately 0.5 to approximately 30%, and the percentage of organic resin binder is from approximately 25 to approximately 40%. The sliding element containing an additive ingredient of the silicon dioxide and/or silicate powders is further improved over that containing only the three ingredients mentioned above in the points of the coefficient of friction and the conformability and wear resistant properties. The functions of the additive ingredients of silicon dioxide and silicate will now be explained. These additive ingredients are capable of preventing an adhesion between the face materials. In this regard, the lead-containing powder and graphite powder, which are incorporated into the organic resin binder, are liable to generate the adhesion mentioned above. When the total percentage of the additive ingredient is less than approximately 2.5%, effective prevention of the adhesion cannot be expected. When the percentage of the additive ingredient is more than approximately 20%, the surface of the sliding element becomes rough, with the result that the mating face material is quickly worn out by the sliding element. The percentage of additive ingredient is preferably from 5 to 20%.

In another embodiment of the present invention, the sliding element comprises from approximately 0.5 to approximately 15% of boron nitride powder, in addition to the coarse and fine graphite powders, the lead-containing powder and the organic resin binder. The grain size of the boron nitride powder should be 60 microns or less and preferably from 10 to 30 microns. The sliding element containing the boron nitride powder is further improved over that containing the lead-containing powder, graphite powder and the organic resin binder in the points of the coefficient of friction and the conformability and wear resistant properties. The boron nitride powder is a hard solid lubricant and can provide the sliding element with a high wear resistance and low coefficient of friction when incorporated in the sliding element. When the percentage of the boron nitride powder is less than approximately 0.5%, it is difficult to effectively improve the high wear resistance and low friction property. On the other hand, when the percentage of boron nitride powder is more than approximately 15%, the mating face material tends to be quickly worn out by the boron nitride powder incorporated in the sliding element. The percentage of boron nitride powder is preferably from approximately 0.5 to 5%.

In a further embodiment of the present invention, the sliding element further comprises: At least one member selected from the group (silicon oxide group) consisting of a silicon dioxide powder and a silicate powder, in an amount of from approximately 2 to approximately 15%, preferably from 5 to 10%, and; a boron nitride powder in an amount of from approximately 0.5 to approximately 15%, preferably from 0.5 to 5%. In this embodiment, the total percentage of the silicon oxide group and the boron nitride powder is preferably from approximately 2.5 to approximately 20%. When the total percentage falls within the range of from approximately 2.5 to approximately 20%, the coefficient of friction of the sliding element, which is dependent upon the face material to be brought into frictional contact with the sliding element, is generally low. Such face material is hereinafter referred to as a mating face material. It is preferable that the percentage of the silicate powder based on the total weight percentage of the silicon dioxide, silicate and boron nitride powders be not more than approximately 80%. When the total weight percentage exceeds approximately 80%, the coefficient of friction and the relative wear amount explained hereinbelow are larger than those of the sliding element in which such percentage is approximately 80% or less.

The present invention will now be explained in further detail by way of the following examples.

EXAMPLE 1

In the present Example, the samples containing the ingredients as shown in Table 1 were prepared by blending the ingredients, hot pressing the blended ingredients at a pressure of 350 kg/cm$^2$ and a temperature of 170° C., over a priod of 3 minutes, and finally, curing the organic resin binder (phenol resin) of the hot pressed body at approximately 190° C., over a period of twelve hours. The property of the ingredients used will now be explained. The graphite powder contained 60% of graphites and had a grain size as given in Table 1. The lead powder had grain size ranging from 10 to 100 microns. The lead powder was a commercially available crushed powder. The silicon dioxide powder was a quartz powder having grain size ranging from 5 to 25 microns. The boron nitride powder had a grain size ranging from 10 to 30 microns.

The prepared samples were subjected to a test by which the sliding characteristics were measured under the following conditions.

Mating Face Material

Material: Equivalent to cast iron

| Mating Face Material | |
|---|---|
| Load: | maximum 20 kg/cm² (no lubricant is used) |
| Atmosphere: | air at 25° C. |
| Testing time period: | 3 hours |

The result of the measurements is illustrated in the following Table 1.

TABLE 1

| Sample No. | Graphite (grain size in mesh)*¹ −145~ +350 (%) | −425 (%) | Lead (%) | Silicon Dioxide (%) | Boron Nitride (%) | Organic Resin (Phenol) | Coefficient of Friction | Heated Temperature (°C.) | Relative Wear amount (ml/ln kg × 10⁻⁵) |
|---|---|---|---|---|---|---|---|---|---|
| 1 (invention) | 55 | 25 | 3 | — | — | bal | 0.10–0.15 | 100–120 | 4.6 |
| 2 (invention) | 40 | 17 | 3 | 10 | — | " | 0.08–0.09 | 76–85 | 1.4 |
| 3 (invention) | 40 | 17 | 3 | — | 5 | " | 0.06–0.11 | 76–102 | 2.1 |
| 4 (invention) | 40 | 17 | 3 | 8 | 2 | " | 0.04–0.05 | 68–72 | 0.7 |
| 5 (invention) | 25 | 40 | 3 | — | — | " | 0.12–0.17 | 103–122 | 5.8 |
| 6 (invention) | 15 | 42 | 3 | 10 | — | " | 0.09–0.10 | 77–89 | 1.8 |
| 7 (invention) | 17 | 40 | 3 | — | 5 | " | 0.08–0.13 | 80–105 | 3.0 |
| 8 (invention) | 17 | 40 | 3 | 8 | 2 | " | 0.06–0.08 | 70–78 | 1.4 |
| 9 (invention) | 55 | 25 | 3 | — | — | " | 0.12–0.17 | 103–122 | 5.8 |
| 10 (control) | — | 60 | 3 | — | — | " | 0.13–0.18 | 108–125 | 6.5 |
| 11 (control) | 60 | — | 3 | — | — | " | 0.14–0.19 | 110–130 | 6.0 |
| 12 (control) | 60*² | — | 3 | — | — | " | 0.16–0.22 | 115–135 | 6.2 |
| 13 (control) | 60*³ | — | 3 | — | — | " | 0.15–0.20 | 110–132 | 6.0 |

Note
*¹ : −425 mesh corresponds to up to 32 μm, and −145 ~ +350 mesh corresponds to 44 ~ 80 μm.
*² : the graphite had a grain size of approximately 400 μm.
*³ : the graphite had a grain size of approximately 100 μm.

| | |
|---|---|
| Surface roughness: | FC20 shaped into a hollow disc 1 micron (μm) at the maximum |
| Sliding speed: | 2 m/sec |
| Dimension: | Inner diameter of hollow part of 16 mm, outer diameter of the disc of 30 mm and thickness 8 mm |
| Samples | |
| Shape: | Cylindrical shape |
| Dimension: | Inner diameter of 19 mm, outer diameter of 23 mm, and thickness of 4 mm |
| Surface roughness: | 1 micron (μm) at the |

In Sample No. 10, the graphite powder consisted only of the fine particles and its relative wear amount is higher than that of Samples Nos. 1 and 5. In sample No. 11, the graphite powder consisted of only the fine particles. When this sample is compared with Samples Nos. 1, 5 and 10, a tendency of increasing the wear amount and heat generation of Sample No. 11 is apparent. This tendency is more apparent, when the graphite powder consists only of very coarse particles (Samples Nos. 12 and 13).

EXAMPLE 2

The procedure of Example 1 was repeated using ingredients given in Table 2.

It will be apparent from Table 2 that the results similar to those in Example 1 are obtained by using several kinds of the organic resins.

TABLE 2

| Sample No. | Graphite Coarse Particles −145~+350 mesh (44~80 μm) | Coarse Particles −145~+425 mesh (32~80 μm) | Fine Particles −425 mesh (<32 μm) | Fine Particles −625 mesh (≦20 μm) | Lead (%) | Silicon Dioxide (%) | Boron Nitride (%) | Organic Resin | Coefficient of Friction | Heated Temperature (°C.) | Relative Wear Amount (ml/ln kg × $10^{-5}$) |
|---|---|---|---|---|---|---|---|---|---|---|---|
| 14 (invention) | 55 | — | 25 | — | 3 | — | — | Phenol (bal) | 0.1–0.15 | 100–120 | 4.6 |
| 15 (invention) | 25 | — | 40 | — | 3 | — | — | " | 0.12–0.17 | 103–122 | 5.8 |
| 16 (invention) | — | 55 | — | 25 | 3 | — | — | " | 0.08–0.09 | 85–100 | 3.5 |
| 17 (invention) | — | 25 | — | 40 | 3 | — | — | " | 0.09–0.1 | 90–105 | 4.8 |
| 18 (invention) | 40 | — | 17 | — | 0.5 | — | — | Epoxy (bal) | 0.09–0.11 | 90–108 | 5.9 |
| 19 (invention) | — | 40 | — | 25 | 5 | — | — | Furan (bal) | 0.07–0.08 | 80–90 | 3.4 |
| 20 (invention) | 30 | — | — | 27 | 1 | 2 | — | Phenol (bal) | 0.05–0.06 | 75–88 | 7.8 |
| 21 (invention) | 20 | — | 10 | — | 10 | 15 | — | " | 0.04–0.06 | 75–85 | 1.8 |
| 22 (invention) | 40 | — | 40 | — | 1 | 7 | 3 | " | 0.05–0.07 | 80–90 | 2.2 |
| 23 (invention) | — | 40 | — | 40 | 3 | — | 2 | " | 0.04–0.06 | 70–80 | 0.6 |
| 24 (invention) | — | 40 | — | 20 | 2 | 8 | 15 | " | 0.02–0.05 | 65–75 | 0.3 |
| 25 (invention) | — | 20 | — | 10 | 1 | — | — | " | 0.04–0.07 | 68–78 | 0.7 |
| 26 (invention) | 40 | — | 20 | — | 2 | — | 5 | polymide (bal) | 0.04–0.06 | 66–75 | 0.7 |
| 27 (invention) | — | 30 | — | 10 | 7 | 1 | 1 | " | 0.04–0.06 | 69–78 | 1.0 |
| 28 (control) | 60 | — | — | — | 3 | — | — | Phenol (bal) | 0.16–0.22 | 115–135 | 6.2 |
| 29 (control) | 60 | — | — | — | 3 | — | — | " | 0.15–0.20 | 110–132 | 6.0 |
| 30 (control) | — | — | — | 60 | — | — | — | " | 0.13–0.18 | 108–125 | 6.5 |
| 31 (control) | 60 | — | — | — | — | — | — | " | 0.14–0.19 | 110–130 | 6.0 |

We claim:

1. A sliding element comprising a hot pressed body, said hot pressed body comprising: from 30 to 80% of a graphite powder including from approximately 15 to 60% of coarse graphite powder having a grain size of from 32 to 80 μm, and the balance of fine graphite powder having a grain size of less than 32 μm; from approximately 0.5 to 30% of lead-containing powder; and, from approximately 15 to approximately 45% of an organic resin binder, all percentages being by weight based on the weight of the hot pressed body.

2. A sliding element according to claim 1, wherein said hot pressed body comprises from approximately 40 to approximately 70% of said graphite powder, and from approximately 25 to approximately 40% of said organic resin binder.

3. A sliding element according to claim 1 or 2, wherein said lead-containing powder is a lead powder.

4. A sliding element according to claim 1 or 2, wherein said hot pressed body comprises at least one member selected from the group consisting of a silicon dioxide powder and a silicate powder, in an amount of from approximately 2 to approximately 15%.

5. A sliding element according to claim 4, wherein said hot pressed body comprises from 5 to 10% of said at least one member.

6. A sliding element according to claim 5, wherein said silicon dioxide powder is a quartz powder.

7. A sliding element according to claim 4, wherein said silicate powder is a sericite powder.

8. A sliding element according to claim 4, wherein said silicate powder is a talc powder.

9. A sliding element according to claim 4, wherein the grain size of said dioxide powder is 50 microns or less.

10. A sliding element according to claim 1 or 2, wherein said hot pressed body comprises from approximately 0.5 to approximately 15% of a boron nitride powder.

11. A sliding element according to claim 10, wherein said hot pressed body comprises from approximately 0.5 to 5% of the boron nitride powder.

12. A sliding element according to claim 10, wherein the grain size of said boron nitride powder is 60 microns or less.

13. A sliding element according to claim 1, wherein said hot pressed body comprises: at least one member selected from the group consisting of a silicon dioxide powder and a silicate powder, in an amount of from approximately 2 to approximately 15%, and; a boron nitride powder in an amount of from approximately 0.5 to approximately 15%.

14. A sliding element according to claim 13, wherein said hot pressed body comprises from 5 to 10% of said at least one member and from 0.5 to 5% of said boron nitride powder.

15. A sliding element according to claim 13, wherein the total percentage of said at least one member and said boron nitride is in the range of from approximately 2.5 to approximately 20%.

16. A sliding element according to claim 15, wherein the percentage of the silicate powder based on the weight percentage of the silicon dioxide, silicate and boron nitride powder is not more than approximately 80%.

* * * * *